United States Patent
Maeda (10) Patent No.: US 7,388,820 B2
(45) Date of Patent: Jun. 17, 2008

(54) OPTICAL DISC READING AND REPRODUCING APPARATUS

(75) Inventor: Tomohisa Maeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 583 days.

(21) Appl. No.: 11/140,946

(22) Filed: Jun. 1, 2005

(65) Prior Publication Data

US 2005/0270916 A1    Dec. 8, 2005

(30) Foreign Application Priority Data

Jun. 2, 2004    (JP)    ............. P2004-164033

(51) Int. Cl.
*G11B 7/00*    (2006.01)
(52) U.S. Cl. .............. 369/53.23; 369/53.28; 369/44.26
(58) Field of Classification Search ............. 369/44.25, 369/44.26, 47.53, 53.11, 53.23, 53.28, 44.11
See application file for complete search history.

(56) References Cited

U.S. PATENT DOCUMENTS 6,392,971 B1 *    5/2002    Takiguchi et al.    ....... 369/47.53

FOREIGN PATENT DOCUMENTS

| JP | 07-044882 | 2/1995 |
|----|-----------|--------|
| JP | 11-120612 | 4/1999 |
| JP | 2002-312959 | 10/2002 |

* cited by examiner

*Primary Examiner*—Nabil Hindi
(74) *Attorney, Agent, or Firm*—Morgan, Lewis & Bockius LLP (57) ABSTRACT

An optical disc reading and reproducing apparatus includes reading means for reading data recorded on an optical disc by applying laser light to the disc through an objective lens and detecting reflected light, focus control means for performing focus control for moving the lens based on a focus error signal, and focus bias adjustment means for adjusting a focus bias to a voltage in which amplitude of an RF signal acquired by the reading means is maximized. When a difference between addresses of a focus bias adjustment information and at which data is read exceeds a predetermined amount, and amplitude of the RF signal is smaller than the amplitude of the RF signal stored, the focus bias is readjusted and the stored focus bias adjustment information is updated to the amplitude of the RF signal after this readjustment and the address of the track to which the focus bias is adjusted.

5 Claims, 5 Drawing Sheets

OPTICAL DISC READING AND REPRODUCING APPARATUS

BACKGROUND OF THE INVENTION

1. Field of the Invention

This invention relates to an optical disc apparatus for reading and reproducing data recorded on an optical disc such as a CD or a DVD.

2. Description of the Related Art

Conventionally, in an optical disc apparatus for reading data recorded on an optical disc such as a CD or a DVD, focus control for matching a focusing position of applied laser light with a record surface of the optical disc has been performed. This focus control is control in which an objective lens arranged between the optical disc and an LD which is a light source is moved in a direction of approaching to and receding from the optical disc. The LD, the objective lens, an actuator for moving this objective lens in the direction of approaching to and receding from the optical disc, etc. are disposed in a pickup head. A signal inputted to the actuator in the focus control is a signal in which a focus servo signal generated based on a focus error signal (hereinafter called FE signal) indicating the amount of deviation of the record surface of the optical disc from the focusing position of the applied laser light is superimposed on a focus bias as is publicly known.

This focus bias is adjusted to a voltage in which amplitude of an RF signal which is a reading signal of data recorded on the optical disc is maximized. In other words, the optical disc apparatus is provided with a configuration for adjusting the focus bias so as to maximize the amplitude of the RF signal. This focus bias adjustment includes, for example, a method for stepwise changing a focus bias and sampling an RF signal and adjusting the focus bias to a voltage in which amplitude of the RF signal is maximized (see JP-A-2002-312959). Also, there are a method for adjusting a focus bias so as to minimize an average value of an error rate or the amount of jitter of an RF signal (see JP-A-11-120612), and a method for making adjustment based on two focus bias voltages in which the same jitter value is obtained in regions of both sides beyond a dead zone region in jitter value characteristics indicating a relation between the jitter value and the focus bias voltage (see JP-A-7-44882).

However, in the conventional optical disc apparatus, when a focus bias is adjusted in the inner circumference side of this optical disc in the case of setting the optical disc in a body, the focus bias adjusted herein is used during reading of data from this optical disc. In other words, the conventional optical disc apparatus had a configuration in which the focus bias is first adjusted only once. On the other hand, the optimum voltage value of the focus bias varies in a radial direction of the optical disc because of warpage etc. of the optical disc. As a result of this, the conventional optical disc apparatus first adjusts the focus bias in the inner circumference side only once as described above, so that there was a problem that data recorded on the outer circumference side of the optical disc is read with the focus bias deviating from the optimum voltage and the data cannot be correctly read from the optical disc.

SUMMARY OF THE INVENTION

An object of the invention is to provide an optical disc apparatus capable of correctly reading data from an optical disc always by readjusting a focus bias according to a reading position of data in a radial direction of the optical disc.

An optical disc apparatus of the invention includes the following configurations in order to solve the problem.

(1) In an optical disc apparatus including reading means for reading data recorded on an optical disc by applying laser light to the optical disc set in a body through an objective lens and detecting its reflected light, focus control means for performing focus control for moving the objective lens in a direction of approaching to and receding from the optical disc so that a focusing position of the laser light matches with a record surface of the optical disc based on a focus error signal indicating the amount of deviation of the focusing position of the laser light from the record surface of the optical disc, and focus bias adjustment means for adjusting a focus bias used in the focus control by the focus control means to a voltage in which amplitude of an RF signal acquired by the reading means is maximized, when the optical disc is set in the body, the focus bias adjustment means adjusts a focus bias in the inner circumference side of this optical disc and focus bias adjustment information in which the amplitude of the RF signal after adjustment is associated with an address of a track to which the focus bias is adjusted this time is stored and in the case that a difference between an address of this focus bias adjustment information and an address at which data is read from the optical disc exceeds a predetermined amount, when amplitude of the RF signal at that point in time is smaller than amplitude of the RF signal stored as the focus bias adjustment information, the focus bias is readjusted in the present reading position and the stored focus bias adjustment information is updated to the amplitude of the RF signal after this readjustment and the address of the track to which the focus bias is adjusted this time and on the other hand, when amplitude of the RF signal at a point in time of exceeding the predetermined amount is larger than or equal to amplitude of the RF signal stored as the focus bias adjustment information, the stored focus bias adjustment information is updated to the amplitude of the RF signal at this point in time and the address at which the data is read at this point in time without readjusting the focus bias.

In this configuration, when the optical disc is first set in the body, the focus bias adjustment means adjusts a focus bias in the inner circumference side of this optical disc, and focus bias adjustment information in which the amplitude of the RF signal at this time is associated with an address of a track to which the focus bias is adjusted is stored. Thereafter, when a reading position of data with respect to the optical disc moves from a position of adjusting the focus bias the previous time to the inner circumference side or the outer circumference side by a predetermined amount, it is determined whether or not amplitude of the RF signal at that point in time is smaller than amplitude of the RF signal at the time of the previous focus bias adjustment stored. When the amplitude of the RF signal at that point in time is smaller than the amplitude of the RF signal stored, it is determined that the focus bias with respect to a reading position of the present data is not correct, and the focus bias is readjusted and the stored focus bias adjustment information is updated. On the other hand, when amplitude of the RF signal at that point in time is larger than or equal to amplitude of the RF signal stored, it is determined that the focus bias with respect to a reading position of the present data is correct, and the stored focus bias adjustment information is updated to the amplitude of the RF signal at that point in time and the address at which the data is read without readjusting the focus bias.

Thus, when the reading position of data moves from the position of adjusting the focus bias the previous time to the inner circumference side or the outer circumference side to some extent, it is determined whether or not the focus bias is correct, and when it is not correct, the focus bias is readjusted, so that the data can correctly be read from the optical disc always. Also, even when the reading position of data moves from the position of adjusting the focus bias the previous time to the inner circumference side or the outer circumference side by the predetermined amount, it is configured so as not to readjust the focus bias when the focus bias does not deviate from the optimum voltage, specifically, when amplitude of the RF signal at that point in time is larger than or equal to amplitude of the RF signal stored, so that useless readjustment of the focus bias is not made.

(2) In the case of performing a seek action for jumping a track to read data from the optical disc, when amplitude of the RF signal at that point in time after the completion of this seek action is smaller than amplitude of the RF signal stored as the focus bias adjustment information, the focus bias adjustment means readjusts the focus bias in the present reading position and the stored focus bias adjustment information is updated to the amplitude of the RF signal after this readjustment and the address of the track to which the focus bias is adjusted this time and on the other hand, when amplitude of the RF signal after the completion of the seek action is larger than or equal to amplitude of the RF signal stored as the focus bias adjustment information, the stored focus bias adjustment information is updated to the amplitude of the RF signal at this point in time and the address at which the data is read at this point in time without readjusting the focus bias.

In this configuration, also when the seek action is performed, a reading position of data moves from a position of adjusting the focus bias the previous time to the inner circumference side or the outer circumference side to some extent, so that as described in the above (1), it is determined whether or not the focus bias deviates from the optimum voltage after the completion of this seek action, and when it deviates, the focus bias is readjusted.

Incidentally, when the focus bias does not deviate from the optimum voltage, the focus bias is not readjusted.

(3) The focus bias adjustment means determines whether or not amplitude of the RF signal increases in the case of being set to a focus bias by a prescribed set amount larger or smaller than the focus bias at that point in time when the focus bias is readjusted, and when the amplitude increases, the focus bias is changed by the prescribed amount in the same direction and the focus bias in which the amplitude of the RF signal is maximized is detected, and on the other hand, when the amplitude decreases, the focus bias is changed by the prescribed amount in the opposite direction and the focus bias in which the amplitude of the RF signal is maximized is detected.

In this configuration, when the focus bias is readjusted, the focus bias at that point in time is increased (or decreased) by a prescribed set amount and it is determined whether amplitude of the RF signal increases or decreases and thereby, it is checked whether the focus bias deviates in either direction. Then, the focus bias is changed in the direction checked herein and the focus bias in which the amplitude of the RF signal is maximized is readjusted.

Therefore, at the time of readjustment of the focus bias, the focus bias is changed in only the deviating direction and is readjusted, so that time necessary for this focus bias readjustment can be reduced.

According to the invention, when a reading position of data moves from a position of adjusting a focus bias the previous time to the inner circumference side or the outer circumference side to some extent, it is determined whether or not the focus bias is correct, and when it is not correct, the focus bias is readjusted, so that the data can correctly be read from an optical disc always. Also, even when the reading position of data moves from the position of adjusting the focus bias the previous time to the inner circumference side or the outer circumference side to some amount, it is configured so as not to readjust the focus bias when the focus bias does not deviate from the optimum voltage, specifically, when amplitude of an RF signal at that point in time is larger than or equal to amplitude of the RF signal stored, so that useless readjustment of the focus bias is not made.

DETAILED DESCRIPTION OF THE INVENTION

An optical disc apparatus which is an embodiment of the invention will be described below.

Figure 1:
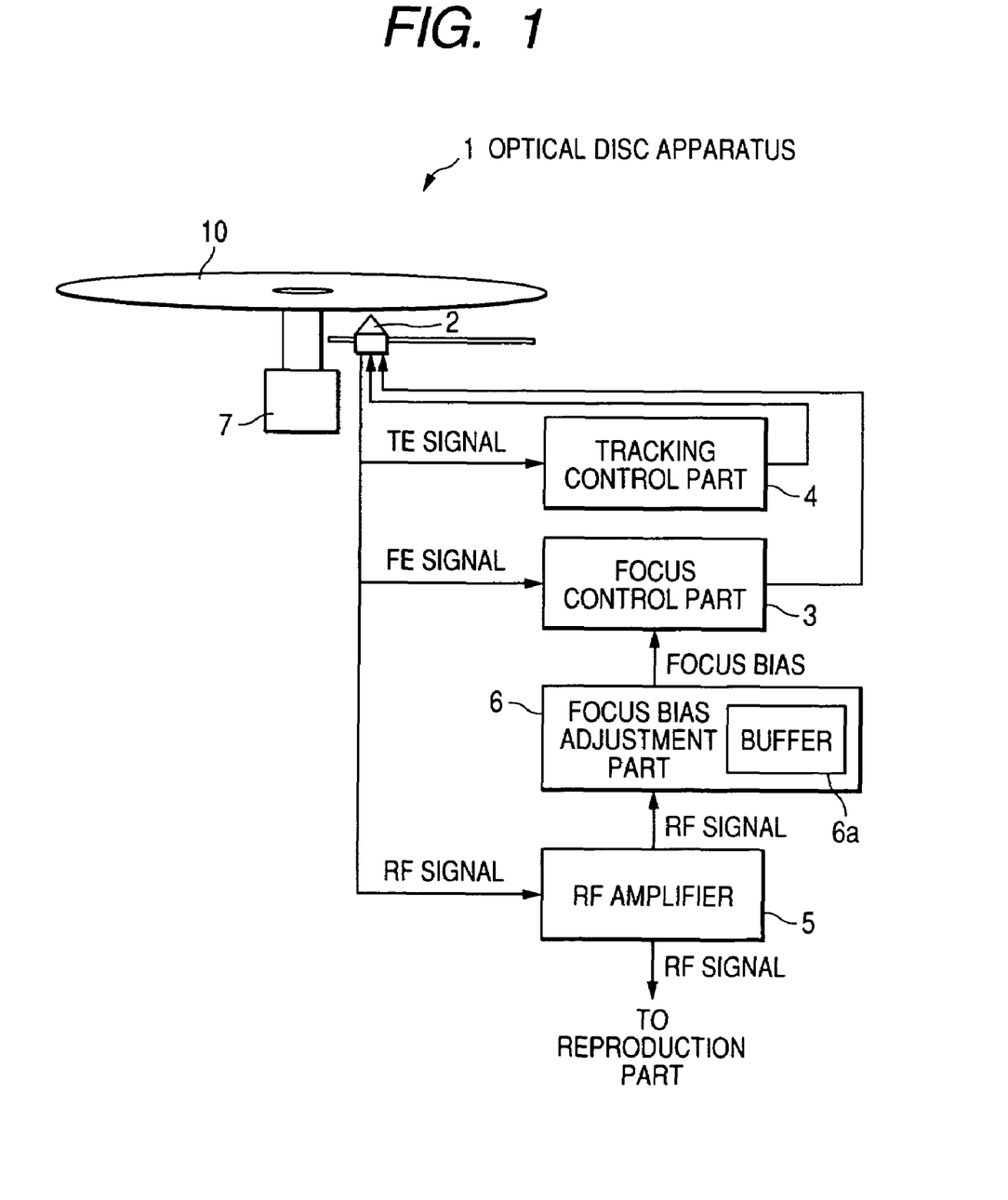
FIG. 1 is a block diagram showing a configuration of a main part of an optical disc apparatus which is an embodiment of the invention.

FIG. 1 is a block diagram showing a configuration of a main part of an optical disc apparatus which is an embodiment of the invention. The optical disc apparatus 1 which is the embodiment of the invention includes a pickup head 2 for applying laser light to an optical disc 10 set in a body, a focus control part 3 for performing focus control of focusing the laser light on a record surface of the optical disc 10, a tracking control part 4 for performing tracking control of matching the laser light with the center of a track of optical disc 10, an RF amplifier 5 for amplifying an RF signal which is a reading signal of data recorded on the optical disc 10, a focus bias adjustment part 6 for adjusting a focus bias, and a spindle motor 7 for rotating the optical disc 10.

The pickup head 2 is provided with an LD which is a light source, an objective lens for collecting the laser light applied from the LD, a biaxial actuator for moving this objective lens in a direction of approaching to and receding from the optical disc 10 and a radial direction of the optical disc 10, a four-division light receiving element for detecting reflected light from the optical disc 10, etc. The pickup head 2 is attached to a shaft extending in the radial direction of the optical disc 10 and is moved in the radial direction of the optical disc 10 by a sled motor (not shown). The pickup head 2 detects the reflected light from the optical disc 10 by the publicly known four-division light receiving element, and outputs a focus error signal (hereinafter called FE signal), a tracking error signal (hereinafter called TE signal) and an RF signal. As is well known, the FE signal is a signal indicating the amount of deviation of the record surface of the optical disc 10 from a focusing position of the laser light applied to the optical disc 10 and is inputted to the focus control part 3, and the TE signal is a signal indicating the amount of deviation of the center of a track of the optical disc 10 from an application position of the laser light applied to the optical disc 10 and is inputted to the tracking control part 4, and the RF signal is a reading signal of data of the optical disc 10 and is inputted to the RF amplifier 5.

The focus control part 3 generates a focus servo signal based on the FE signal inputted from the pickup head 2, and a signal in which this focus servo signal is superimposed on a focus bias is inputted to the actuator. As a result of this, the objective lens disposed in the pickup head 2 is moved in the direction of approaching to and receding from the optical disc 10, and the focusing position of the laser light applied from the LD of the pickup head 2 is matched with the record surface of the optical disc 10. The tracking control part 4 generates a tracking servo signal based on the TE signal inputted from the pickup head 2, and this tracking servo signal is inputted to the actuator. As a result of this, the objective lens disposed in the pickup head 2 is moved in the radial direction of the optical disc 10, and the application position of the laser light applied from the LD of the pickup head 2 is matched with the center of the track of the optical disc 10. Also, the tracking control part 4 drives the sled motor (not shown) and moves the pickup head 2 in the radial direction of the optical disc when the laser light applied from a light emitting element of the pickup head 2 cannot be applied to a target track by only movement of the objective lens through the actuator.

The RF amplifier 5 amplifies the RF signal inputted, and this signal is inputted to a reproduction part (not shown). The reproduction part decodes the RF signal inputted, and generates and outputs a reproduction signal of data read from the optical disc 10. Also, the RF amplifier 5 inputs the amplified RF signal to the focus bias adjustment part 6. The focus bias adjustment part 6 determines whether or not it is necessary to adjust or readjust a focus bias using the RF signal inputted from the RF amplifier 5. Also, the focus bias adjustment part 6 is provided with a buffer 6a for storing focus bias adjustment information in which amplitude of the RF signal after adjusting the focus bias is associated with an address of a track to which the focus bias is adjusted. The focus bias adjustment part 6 changes the focus bias inputted to the focus control part 3 into the focus bias after adjustment every time the focus bias is adjusted.

Figure 2:
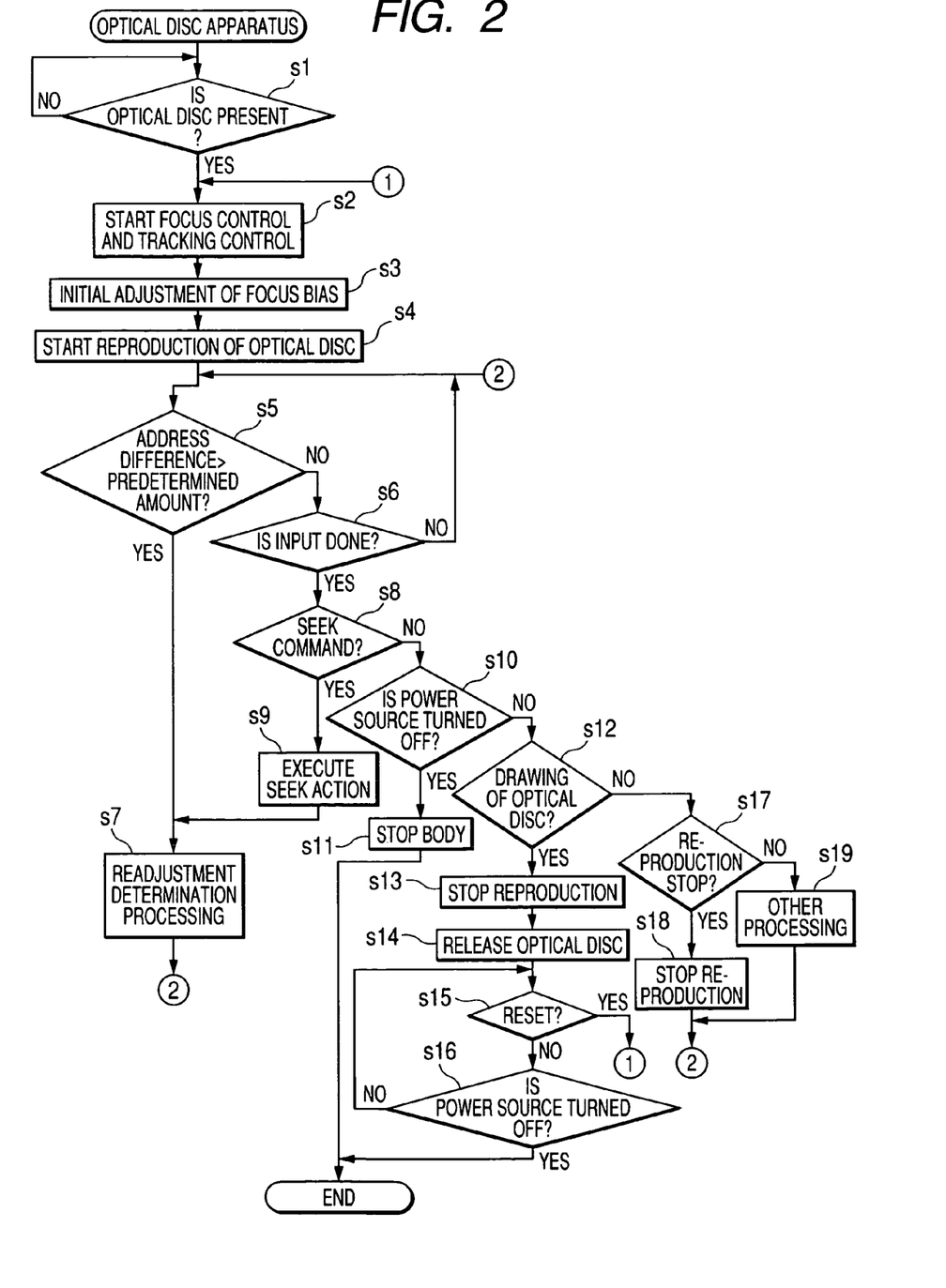
FIG. 2 is a flowchart showing an action of the optical disc apparatus of this embodiment.

Next, an action in the optical disc apparatus 1 of this embodiment will be described. FIG. 2 is a flowchart showing an action of the optical disc apparatus of this embodiment. The optical disc apparatus 1 starts this processing when a power source of a body is turned on. When the power source of the body is turned on, the optical disc apparatus 1 determines whether or not the optical disc 10 is set in the body (s1), and when the optical disc 10 is not set, it waits for the optical disc to be set. When the optical disc 10 is set in the body, the optical disc apparatus 1 starts tracking control by the tracking control part 4 and focus control by the focus control part 3 in the inner circumference side of the optical disc 10 (s2). At this time, the focus-bias adjustment part 6 inputs a predetermined voltage to the focus control part 3 as a focus bias.

Figure 3:
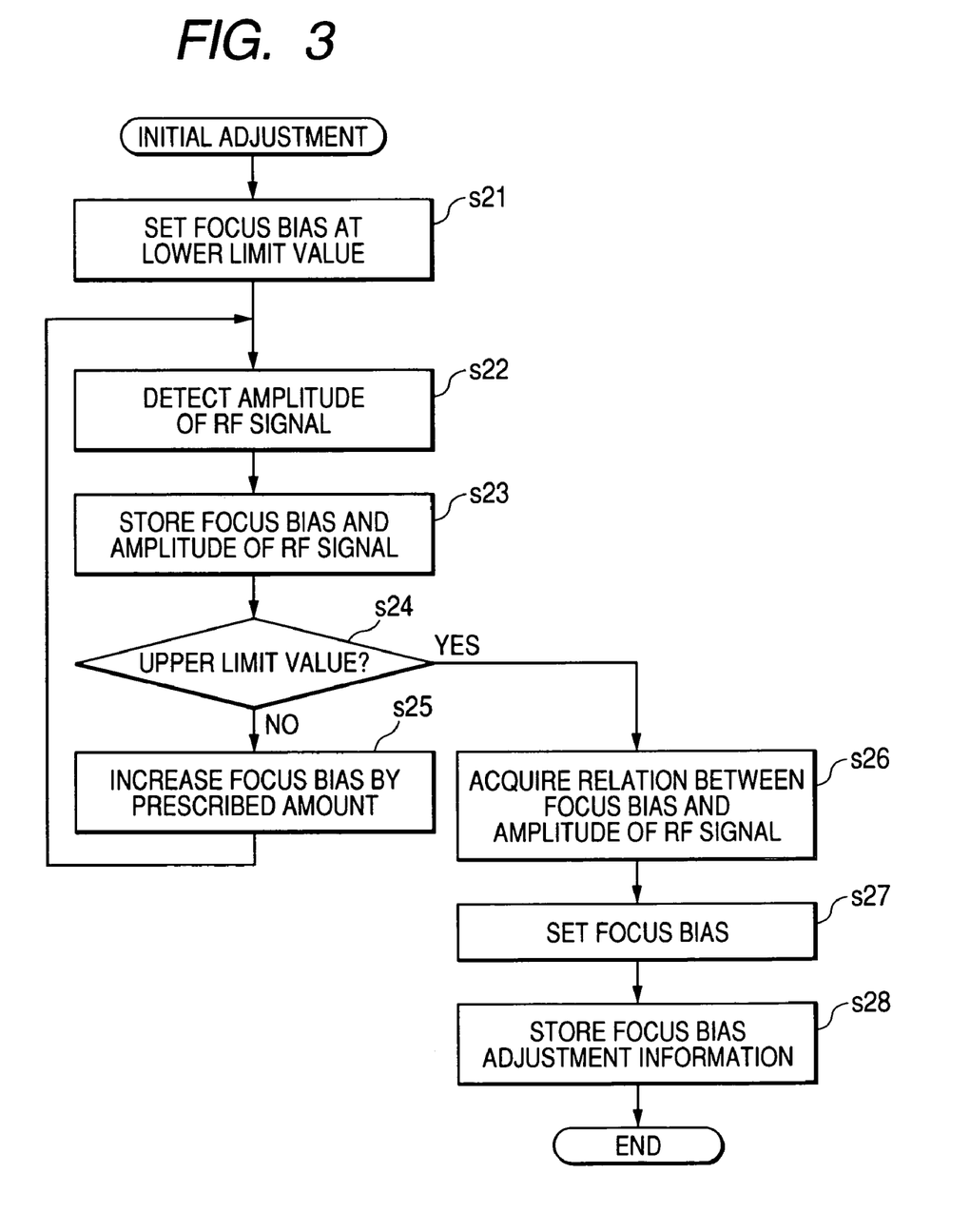
FIG. 3 is a flowchart showing processing according to initial adjustment of a focus bias.

The optical disc apparatus 1 next makes initial adjustment of the focus bias (s3). FIG. 3 is a flow chart showing processing according to the initial adjustment of this focus bias. The focus bias adjustment part 6 sets a focus bias inputted to the focus control part 3 at a predetermined lower limit value (s21). As a result of this, the focus bias superimposed on a signal inputted from the focus control part 3 to the actuator becomes this lower limit value. The focus bias adjustment part samples an RF signal inputted from the RF amplifier 5 and detects amplitude of this RF signal (s22). Then, the focus bias at this time is associated with the amplitude of the RF signal detected in s22 to store them (s23). The focus bias adjustment part 6 determines whether or not a focus bias inputted to the focus control part 3 is a predetermined upper limit value (s24), and when it is not the upper limit value, the focus bias inputted to the focus control part 3 is increased by a prescribed amount, for example, 10 mV (s25) and the flowchart returns to s22 and the processing described above is repeated.

Figure 4:
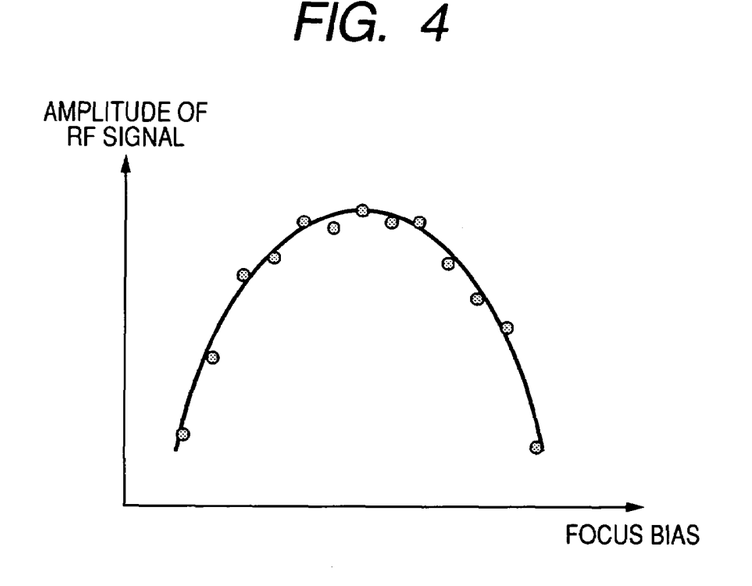
FIG. 4 is a diagram describing a method for calculating a relation between the focus bias and amplitude of an RF signal.

By repeating the processing of s22 to s25, the focus bias adjustment part acquires a change in the amplitude of the RF signal at the time when the focus bias inputted to the focus control part 3 is changed from the lower limit value to the upper limit value by the prescribed amount. In the case of determining that the focus bias is the upper limit value in s24, the focus bias adjustment part 6 calculates a relation between the focus bias and the amplitude of the RF signal (s26). For example, as shown in FIG. 4, quadratic approximation of a change in the amplitude of the RF signal at the time when the focus bias is changed from the lower limit value to the upper limit value by the prescribed amount is calculated in s26. From the relation between the focus bias and the amplitude of the RF signal calculated in s26, the focus bias adjustment part detects a voltage of the focus bias in which the amplitude of the RF signal is maximized, and sets this voltage to the focus bias inputted to the focus control part 3 (s27). The focus bias adjustment part 6 generates focus bias adjustment information in which the amplitude of the RF signal obtained at the time when the focus bias set in s27 is inputted to the focus control part 3 is associated with an address of a track to which the focus bias is adjusted this time, and stores this information in the buffer 6a (s28), and the present processing is ended.

Returning to FIG. 2, when the initial adjustment of the focus bias according to s3 is completed, the optical disc apparatus 1 starts reproduction of the optical disc 10 (s4). When the reproduction is started in s4, the optical disc apparatus 1 determines whether or not a difference between an address of a reading position of the present data with respect to the optical disc 10 and an address to which the focus bias stored in the buffer 6a as the focus bias adjustment information is adjusted the previous time exceeds a predetermined amount, and waits until some input to the body is done (s5, s6). In the case of determining that the difference between both the addresses exceeds the predetermined amount in s5, the optical disc apparatus 1 performs readjustment determination processing of the focus bias (s7). The readjustment determination processing of the focus bias according to this s7 will be described below.

Also, when some input to the body is done, the optical disc apparatus 1 performs a seek action in the case that its input is a seek command for jumping a track to read data (s8, s9), and proceeds to s7 and performs the readjustment determination processing of the focus bias. Also, when the input to the body is an off state of a power source, the body is stopped and the present processing is ended (s10, s11). Also, when the input is drawing of the optical disc 10, reproduction of the optical disc 10 is stopped (s12, s13) and the optical disc 10 set in the body is released (s14) and it waits until the optical disc 10 is reset in the body or a power source of the body is turned off (s15, s16). When the optical disc 10 is reset in the body, the flowchart returns to s2. When the power source of the body is turned off, the present processing is ended. Also, when the input to the body is a reproduction stop, the optical disc apparatus 1 stops reproduction (s17, s18) and the flowchart returns to s5. In the case of returning to s5 herein, the reproduction is stopped, so that it waits for a new input to the body substantially.

Incidentally, when the input to the body is an input other than the contents described above, the optical disc apparatus 1 performs processing (other processing) with respect to its input (s19) and the flowchart returns to s5.

As is evident from the above description, the optical disc apparatus 1 of this embodiment performs the readjustment determination processing of the focus bias according to s7

(1) when the difference between the address of the reading position of the present data with respect to the optical disc 10 and the address to which the focus bias stored in the buffer 6a as the focus bias adjustment information is adjusted the previous time exceeds the predetermined amount, or (2) when the seek is performed. Under the circumstances of (1) and (2), a position of a track in which the present data is read moves in a radial direction to some extent from a position of a track to which the focus bias is adjusted the previous time. As a result of this, there is a high possibility that the previous adjusted focus bias deviates from the optimum value because of warpage etc. of the optical disc 10. In other words, there is a high possibility that data cannot be correctly read from the optical disc 10.

Figure 5:
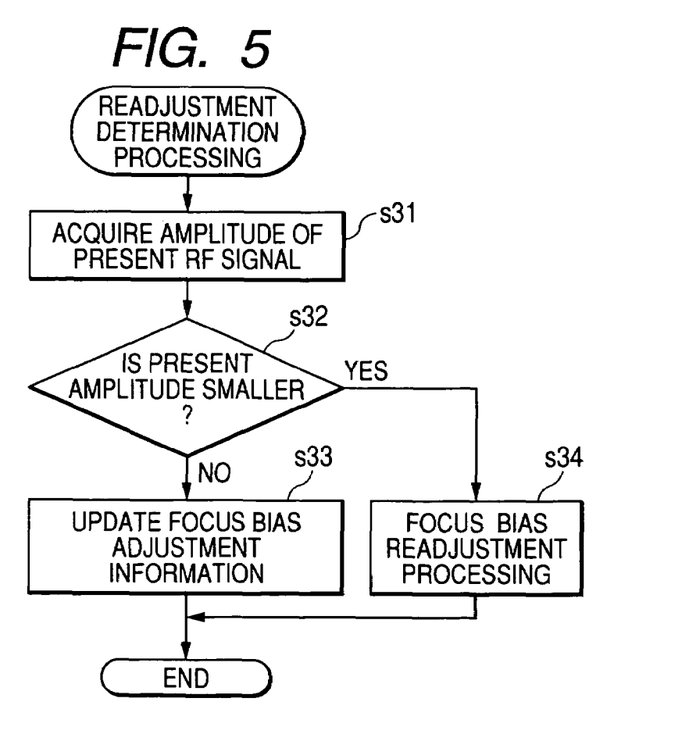
FIG. 5 is a flowchart showing focus bias readjustment determination processing according to s7.

FIG. 5 is a flowchart showing the focus bias readjustment determination processing according to s7. The optical disc apparatus 1 acquires amplitude of the present RF signal (s31), and compares the amplitude with amplitude of an RF signal at the time of adjusting the focus bias stored in the buffer 6a as the focus bias adjustment information the previous time (s32) When the amplitude of the present RF signal is larger than or equal to the amplitude of the RF signal at the time of the previous adjustment, the optical disc apparatus 1 determines that the focus bias set at present does not deviate from the optimum value, and focus bias adjustment information in which the amplitude of the present RF signal is associated with an address of a track in which the present data is read is generated, and the focus bias adjustment information stored in the buffer 6a is updated to the focus bias adjustment information generated this time (s33), and the present processing is ended. On the other hand, when the amplitude of the present RF signal is smaller than the amplitude of the RF signal at the time of the previous adjustment in s32, it is determined that the focus bias set at present deviates from the optimum value, and readjustment processing of the focus bias is performed (s34). The optical disc apparatus 1 returns to s5 when the readjustment determination processing of the focus bias according to s7 is completed.

Figure 6:
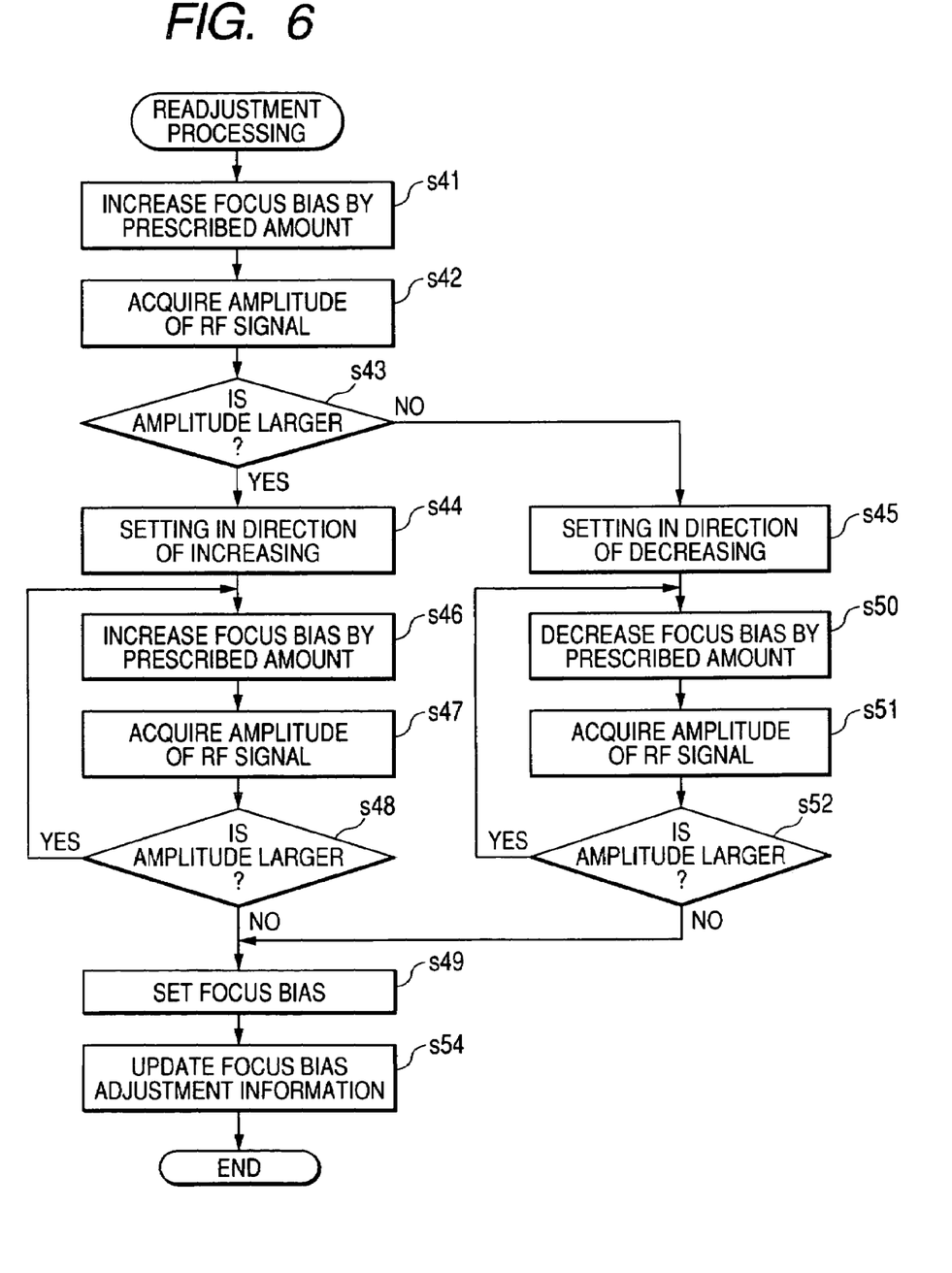
FIG. 6 is a flowchart showing focus bias readjustment processing according to s34.

Next, focus bias readjustment processing according to s34 will be described. FIG. 6 is a flowchart showing the focus bias readjustment processing according to s34. The focus bias adjustment part 6 increases a focus bias inputted to the focus control part 3 by a prescribed amount (s41). In s41, the focus bias inputted to the focus control part 3 is constructed so as to be increased by the prescribed amount, but may be decreased by the prescribed amount. The focus bias adjustment part 6 samples an RF signal inputted from the RF amplifier 5 and detects amplitude of the RF signal (s42).

Then, the amplitude of the RF signal acquired in s31 is compared with the amplitude of the RF signal acquired in s42 this time (amplitude of the RF signal at the time of increasing the focus bias by the prescribed amount) (s43). Here, when the amplitude of the RF signal acquired in s42 is larger, it is determined that the present focus bias deviates from the optimum voltage to a lower value, and this focus bias readjustment is set in a direction of increasing the focus bias inputted to the focus control part 3 by the prescribed amount (s44). On the other hand, when the amplitude of the RF signal acquired in s42 is smaller, it is determined that the present focus bias deviates from the optimum voltage to a higher value, and this focus bias readjustment is set in a direction of decreasing the focus bias inputted to the focus control part 3 by the prescribed amount (s45).

Incidentally, in the case of decreasing the focus bias inputted to the focus control part 3 by the prescribed amount in s41, the determination of s44 and s45 described above could be reversed.

In the case of being set in the direction of increasing the focus bias inputted to the focus control part 3 by the prescribed amount in s44, the focus bias adjustment part 6 increases the focus bias inputted to the focus control part 3 by the prescribed amount (s46), and samples an RF signal inputted from the RF amplifier 5, and detects amplitude of this RF signal (s47). Then, it is determined whether or not the amplitude is larger than amplitude of the RF signal detected the previous time in this readjustment processing (s48), and when it is larger, the flowchart returns to s46. On the other hand, in the case of determining that it is smaller than amplitude of the RF signal detected the previous time in s48, the focus bias inputted to the focus control part 3 previously, in other words, the focus bias in which amplitude of the RF signal is maximized is set to the optimum focus bias (s49).

Also, in the case of being set in the direction of decreasing the focus bias inputted to the focus control part 3 by the prescribed amount in s44, the focus bias adjustment part 6 decreases the focus bias inputted to the focus control part 3 by the prescribed amount (s50), and samples an RF signal inputted from the RF amplifier 5, and detects amplitude of this RF signal (s51). Then, it is determined whether or not the amplitude is larger than amplitude of the RF signal detected the previous time in this readjustment processing (s52), and when it is larger, the flowchart returns to s50. On the other hand, in the case of determining that it is smaller than amplitude of the RF signal detected the previous time in s52, the focus bias inputted to the focus control part 3 previously in s49, in other words, the focus bias in which amplitude of the RF signal is maximized is set to the optimum focus bias.

In the case of being set to the optimum focus bias in s49, the focus bias adjustment part 6 generates focus bias adjustment information in which amplitude of the RF signal obtained at the time of inputting the focus bias set in s49 to the focus control part 3 is associated with an address of a track to which the focus bias is readjusted this time, and updates the focus bias adjustment information stored in the buffer 6a to the focus bias adjustment information generated this time (s53), and the present processing is ended.

Thus, when there is a high possibility that the previous adjusted focus bias deviates from the optimum value because of warpage etc. of the optical disc 10, the optical disc apparatus 1 of this embodiment performs the focus bias readjustment determination processing according to s7, and determines whether or not the focus bias actually deviates from the optimum value, and when the focus bias does not deviate from the optimum value, readjustment of the focus bias is not made. In other words, useless readjustment of the focus bias is not made.

Also, in the case of determining that the focus bias deviates from the optimum value in the focus bias readjustment determination processing, the focus bias is readjusted, so that data can correctly be read from the optical disc 10 always.

Further, the focus bias readjustment processing has a configuration in which it is determined whether the present focus bias deviates from the optimum voltage to a higher value or a lower value and the focus bias inputted to the focus control part 3 is changed by a prescribed amount in a direction based on this determination and it is readjusted to the optimum focus bias, so that time necessary for this focus bias readjustment processing can be reduced.

What is claimed is:

1. An optical disc reading and reproducing apparatus comprising:

reading means for reading data recorded on an optical disc by applying laser light to the optical disc set in a body through an objective lens and detecting its reflected light;

focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc; and focus bias adjustment means for adjusting a focus bias used in the focus control by the focus control means to a voltage in which amplitude of an RF signal acquired by the reading means is maximized, wherein when the optical disc is set in the body, the focus bias adjustment means adjusts a focus bias in an inner circumference side of this optical disc, focus bias adjustment information in which the amplitude of the RF signal after adjustment is associated with an address of a track to which the focus bias is adjusted this time is stored, in the case that a difference between an address of this focus bias adjustment information and an address at which data is read from the optical disc exceeds a predetermined amount, when amplitude of the RF signal at that point in time is smaller than the amplitude of the RF signal stored as the focus bias adjustment information, the focus bias is readjusted in the present reading position and the stored focus bias adjustment information is updated to the amplitude of the RF signal after this readjustment and the address of the track to which the focus bias is adjusted this time, and when the amplitude of the RF signal at a point in time of exceeding the predetermined amount is larger than or equal to the amplitude of the RF signal stored as the focus bias adjustment information, the stored focus bias adjustment information is updated to the amplitude of the RF signal at this point in time and the address at which the data is read at this point in time without readjusting the focus bias, in the case of performing a seek action for jumping a track to read data from the optical disc, when amplitude of the RF signal at that point in time after completion of this seek action is smaller than the amplitude of the RF signal stored as the focus bias adjustment information, the focus bias is readjusted in the present reading position and the stored focus bias adjustment information is updated to the amplitude of the RF signal after this readjustment and the address of the track to which the focus bias is adjusted this time, and when the amplitude of the RF signal after the completion of the seek action is larger than or equal to the amplitude of the RF signal stored as the focus bias adjustment information, the stored focus bias adjustment information is updated to the amplitude of the RF signal at this point in time and the address at which data is read at this point in time without readjusting the focus bias, and it is determined whether or not amplitude of the RF signal increases in the case of being set to a focus bias by a prescribed set amount larger or smaller than the focus bias at that point in time when the focus bias is readjusted, when the amplitude increases, the focus bias is changed by the prescribed amount in the same direction and the focus bias in which the amplitude of the RF signal is maximized is detected, and when the amplitude decreases, the focus bias is changed by the prescribed amount in the opposite direction and the focus bias in which the amplitude of the RF signal is maximized is detected.

2. An optical disc reading and reproducing apparatus comprising:

reading means for reading data recorded on an optical disc by applying laser light to the optical disc set in a body through an objective lens and detecting its reflected light;

focus control means for performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc; and focus bias adjustment means for adjusting a focus bias used in the focus control by the focus control means to a voltage in which amplitude of an RF signal acquired by the reading means is maximized, wherein when the optical disc is set in the body, the focus bias adjustment means adjusts a focus bias in an inner circumference side of this optical disc, focus bias adjustment information in which the amplitude of the RF signal after adjustment is associated with an address of a track to which the focus bias is adjusted this time is stored, in the case that a difference between an address of this focus bias adjustment information and an address at which data is read from the optical disc exceeds a predetermined amount, when amplitude of the RF signal at that point in time is smaller than the amplitude of the RF signal stored as the focus bias adjustment information, the focus bias is readjusted in the present reading position and the stored focus bias adjustment information is updated to the amplitude of the RF signal after this readjustment and the address of the track to which the focus bias is adjusted this time, and when the amplitude of the RF signal at a point in time of exceeding the predetermined amount is larger than or equal to the amplitude of the RF signal stored as the focus bias adjustment information, the stored focus bias adjustment information is updated to the amplitude of the RF signal at this point in time and the address at which the data is read at this point in time without readjusting the focus bias.

3. The optical disc reading and reproducing apparatus as claimed in claim 2, wherein in the case of performing a seek action for jumping a track to read data from the optical disc, when amplitude of the RF signal at that point in time after completion of this seek action is smaller than the amplitude of the RF signal stored as the focus bias adjustment information, the focus bias adjustment means readjusts the focus bias in the present reading position and the stored focus bias adjustment information is updated to the amplitude of the RF signal after this readjustment and the address of the track to which the focus bias is adjusted this time, and when the amplitude of the RF signal after the completion of the seek action is larger than or equal to the amplitude of the RF signal stored as the focus bias adjustment information, the stored focus bias adjustment information is updated to the amplitude of the RF signal at this point in time and the address at which data is read at this point in time without readjusting the focus bias.

4. The optical disc reading and reproducing apparatus as claimed in claim 2, wherein the focus bias adjustment means determines whether or not amplitude of the RF signal increases in the case of being set to a focus bias by a prescribed set amount larger or smaller than the focus bias at that point in time when the focus bias is readjusted, and when the amplitude increases, the focus bias is changed by the prescribed amount in the same direction and the focus bias in which the amplitude of the RF signal is maximized is detected, and when the amplitude decreases, the focus bias is changed by the prescribed amount in the opposite direction and the focus bias in which the amplitude of the RF signal is maximized is detected.

5. An optical disc reading and reproducing method comprising:

reading data recorded on an optical disc by applying laser light to the optical disc set in a body through an objective lens and detecting its reflected light;

performing focus control for moving the objective lens in a direction of approaching to and receding from the optical disc so that a focusing position of the laser light matches with a record surface of the optical disc based on a focus error signal indicating an amount of deviation of the focusing position of the laser light from the record surface of the optical disc;

adjusting a focus bias used in the focus control to a voltage in which amplitude of an acquired RF signal is maximized;

when the optical disc is set in the body, adjusting a focus bias in an inner circumference side of this optical disc;

storing focus bias adjustment information in which the amplitude of the RF signal after adjustment is associated with an address of a track to which the focus bias is adjusted this time;

in the case that a difference between an address of this focus bias adjustment information and an address at which data is read from the optical disc exceeds a predetermined amount, when amplitude of the RF signal at that point in time is smaller than the amplitude of the RF signal stored as the focus bias adjustment information, readjusting the focus bias in the present reading position and updating the stored focus bias adjustment information to the amplitude of the RF signal after this readjustment and the address of the track to which the focus bias is adjusted this time, and when the amplitude of the RF signal at a point in time of exceeding the predetermined amount is larger than or equal to the amplitude of the RF signal stored as the focus bias adjustment information, updating the stored focus bias adjustment information to the amplitude of the RF signal at this point in time and the address at which the data is read at this point in time without readjusting the focus bias;

in the case of performing a seek action for jumping a track to read data from the optical disc, when amplitude of the RF signal at that point in time after completion of this seek action is smaller than the amplitude of the RF signal stored as the focus bias adjustment information, readjusting the focus bias in the present reading position and updating the stored focus bias adjustment information to the amplitude of the RF signal after this readjustment and the address of the track to which the focus bias is adjusted this time, and when the amplitude of the RF signal after the completion of the seek action is larger than or equal to the amplitude of the RF signal stored as the focus bias adjustment information, updating the stored focus bias adjustment information to the amplitude of the RF signal at this point in time and the address at which data is read at this point in time without readjusting the focus bias; and determining whether or not amplitude of the RF signal increases in the case of being set to a focus bias by a prescribed set amount larger or smaller than the focus bias at that point in time when the focus bias is readjusted, when the amplitude increases, changing the focus bias by the prescribed amount in the same direction and detecting the focus bias in which the amplitude of the RF signal is maximized, and when the amplitude decreases, changing the focus bias by the prescribed amount in the opposite direction and detecting the focus bias in which the amplitude of the RF signal is maximized.

* * * * *